United States Patent
Ahn et al.

(10) Patent No.: US 10,225,808 B2
(45) Date of Patent: Mar. 5, 2019

(54) METHOD FOR CONTROLLING TRANSMISSION POWER IN UNLICENSED BAND AND DEVICE USING SAME

(71) Applicant: LG ELECTRONICS INC., Seoul (KR)

(72) Inventors: Joonkui Ahn, Seoul (KR); Byounghoon Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1 day.

(21) Appl. No.: 15/512,451

(22) PCT Filed: Sep. 14, 2015

(86) PCT No.: PCT/KR2015/009634
§ 371 (c)(1),
(2) Date: Mar. 17, 2017

(87) PCT Pub. No.: WO2016/047951
PCT Pub. Date: Mar. 31, 2016

(65) Prior Publication Data
US 2017/0295046 A1 Oct. 12, 2017

Related U.S. Application Data

(60) Provisional application No. 62/053,811, filed on Sep. 23, 2014.

(51) Int. Cl.
*H04W 52/30* (2009.01)
*H04W 52/36* (2009.01)
(Continued)

(52) U.S. Cl.
CPC .......... *H04W 52/30* (2013.01); *H04L 5/0053* (2013.01); *H04L 27/0006* (2013.01);
(Continued)

(58) Field of Classification Search
CPC .. H04L 27/0006; H04L 5/0053; H04W 88/06; H04W 74/0808; H04W 52/30;
(Continued)

(56) References Cited

U.S. PATENT DOCUMENTS

| | | |
|---|---|---|
| 2011/0212739 A1 | 9/2011 | Pedersen et al. |
| 2013/0035124 A1 | 2/2013 | Schmidt et al. |
| 2013/0203458 A1* | 8/2013 | Charbit ................ H04W 52/34 455/522 |

OTHER PUBLICATIONS

PCT International Application No. PCT/KR2015/009634, International Search Report dated Dec. 18, 2015, 2 pages.
(Continued)

*Primary Examiner* — Kwang B Yao
*Assistant Examiner* — Moo Jeong
(74) *Attorney, Agent, or Firm* — Lee, Hong, Degerman, Kang & Waimey

(57) ABSTRACT

Provided are a method and a device for controlling transmission power in a wireless communication system. The device conducts an adjustment such that the transmission power of an UL (uplink) signal, with respect to a serving cell in an unlicensed band, does not exceed the maximum PSD (power spectral density) of the unlicensed band.

9 Claims, 4 Drawing Sheets

(51) Int. Cl.
  *H04W 52/14* (2009.01)
  *H04W 88/06* (2009.01)
  *H04W 16/14* (2009.01)
  *H04W 74/08* (2009.01)
  *H04L 5/00* (2006.01)
  *H04L 27/00* (2006.01)
(52) U.S. Cl.
  CPC ........... *H04W 16/14* (2013.01); *H04W 52/14* (2013.01); *H04W 52/146* (2013.01); *H04W 52/367* (2013.01); *H04W 74/0808* (2013.01); *H04W 88/06* (2013.01)
(58) Field of Classification Search
  CPC ... H04W 52/14; H04W 16/14; H04W 52/367; H04W 52/146
  See application file for complete search history.

(56) References Cited

OTHER PUBLICATIONS

Huawei, et al., "Summary of a workshop on LTE in Unlicensed Spectrum", RP-140060, 3GPP TSG RAN Meeting #63, Mar. 2014, 4 pages.
Zte, et al., "Supporting dual connectivity in LTE-U", RP-141470, 3GPP TSG RAN Meeting #65, Sep. 2014, 5 pages.
3rd Generation Partnership Project, "Technical Specification Group Radio Access Network; Evolved Universal Terrestrial Radio Access (E-UTRA); User Equipment (UE) radio transmission and reception (Release 10)" 3GPP TS 36.101 V10.3.0, Jun. 2011, 12 pages.

\* cited by examiner

METHOD FOR CONTROLLING TRANSMISSION POWER IN UNLICENSED BAND AND DEVICE USING SAME

CROSS-REFERENCE TO RELATED APPLICATIONS

This application is the National Stage filing under 35 U.S.C. 371 of International Application No. PCT/KR2015/009634, filed on Sep. 14, 2015, which claims the benefit of U.S. Provisional Application No. 62/053,811, filed on Sep. 23, 2014, the contents of which are all hereby incorporated by reference herein in their entirety.

BACKGROUND OF THE INVENTION

Field of the Invention

The present invention relates to wireless communication, and more particularly, to a method of controlling transmit power in an unlicensed band in a wireless communication system, and an apparatus using the method.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

Since various wireless access techniques perform the CCA in the unlicensed band, there is a need for a method capable of reducing an interference.

SUMMARY OF THE INVENTION

The present invention provides a method for controlling transmit power in an unlicensed band, and an apparatus using the method.

In an aspect, a method for controlling a transmit power in a wireless communication system includes determining, by a wireless device, a transmit power of an uplink (UL) signal for a serving cell in an unlicensed band, and adjusting, by the wireless device, the transmit power of the UL signal not to exceed a maximum power spectral density (PSD) of the unlicensed band.

The method may further include adjusting, by the wireless device, the transmit power of the UL signal not to exceed a total maximum transmit power for all serving cells in the unlicensed band.

In another aspect, an apparatus for controlling a transmit power in a wireless communication system includes a transceiver configured to transmit and receive a radio signal and a processor operatively coupled to the transceiver. The processor is configured to determine a transmit power of an uplink (UL) signal for a serving cell in an unlicensed band and adjust the transmit power of the UL signal not to exceed a maximum power spectral density (PSD) of the unlicensed band.

An interference can be reduced in an environment where various communication protocols coexist in an unlicensed band.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a $3^{rd}$ generation partnership project (3GPP) long term evolution (LTE) based on 3GPP technical specification (TS). However, this is for exemplary purposes only, and thus the present invention is also applicable to various wireless communication networks.

In a carrier aggregation (CA) environment or a dual connectivity environment, the wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
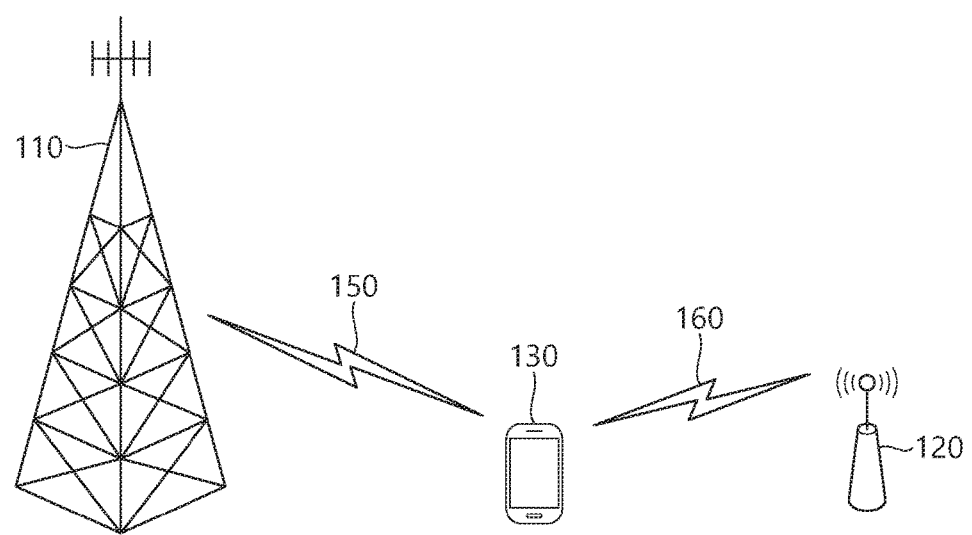
FIG. 1 shows an example of a long term evolution (LTE) service using an unlicensed band.

FIG. 1 shows an example of an LTE service using an unlicensed band.

A wireless device 130 establishes a connection with a $1^{st}$ BS 110, and receives a service through a licensed band. For traffic offloading, the wireless device 130 may receive a service through an unlicensed band with respect to a $2^{nd}$ BS 120.

The $1^{st}$ BS 110 is a BS supporting an LTE system, whereas the $2^{nd}$ BS 120 may also support other communication protocols such as a wireless local area network (WLAN) in addition to LTE. The $1^{st}$ BS 110 and the $2^{nd}$ BS 120 may be associated with a carrier aggregation (CA) environment, and a specific cell of the $1^{st}$ BS 110 may be a primary cell. Alternatively, the $1^{st}$ BS 110 and the $2^{nd}$ BS 120 may be associated with a dual connectivity environment, and a specific cell of the $1^{st}$ BS 110 may be a primary cell. In general, the $1^{st}$ BS 110 having the primary cell has wider coverage than the $2^{nd}$ BS 120. The $1^{st}$ BS 110 may be called a macro cell. The $2^{nd}$ BS 120 may be called a small cell, a femto cell, or a micro cell. The $1^{st}$ BS 110 may operate the primary cell and zero or more secondary cells. The $2^{nd}$ BS 120 may operate one or more secondary cells. The secondary cell may be activated/deactivated by an indication of the primary cell.

The above description is for exemplary purposes only. The $1^{st}$ BS 110 may correspond to the primary cell, and the $2^{nd}$ BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5 GHz band used in a WLAN.

It is assumed in the unlicensed band that a channel is occupied basically through contention between respective communication nodes. Therefore, in communication in the unlicensed band, it is required to confirm that signal transmission is not achieved by other communication nodes by performing channel sensing. For convenience, this is called a listen before talk (LBT), and if it is determined that signal transmission is not achieved by other communication nodes, this case is defined as confirmation of clear channel assessment (CCA).

The LBT must be performed preferentially in order for a BS or wireless device of an LTE system to have access to a channel in the unlicensed band. Further, when the BS or wireless device of the LTE system transmits a signal, an interference problem may occur since other communication nodes such as the WLAN or the like also perform the LBT. For example, in the WLAN, a CCA threshold is defined as −62dBm as to a non-WLAN signal and is defined as −82dBm as to a WLAN signal. This means that interference may occur in an LTE signal due to other WLAN devices when the LTE signal is received with power less than or equal to −62dBm.

Hereinafter, when it is said that 'LBT is performed' or 'CCA is performed', it implies that whether a channel is idle or is used by another node is confirmed first and thereafter the channel is accessed.

Hereinafter, the LTE and the WLAN are described for example as a communication protocol used in the unlicensed band. This is for exemplary purposes only, and thus it may also be said that a $1^{st}$ communication protocol and a $2^{nd}$ communication protocol are used in the unlicensed band. ABS supports the LTE. A UE is a device supporting the LTE.

Hereinafter, although it is described that downlink (DL) transmission is based on transmission performed by a BS and uplink (UL) transmission is based on transmission performed by a UE, the DL transmission and the UL transmission may also be performed by a transmission node or node group in a wireless network. The UE may imply an individual node which exists for each user, and the BS may imply a central node for transmitting/receiving and controlling data for a plurality of individual nodes. From this perspective, the term 'BS' may be replaced with a DL node, and the term 'UE' may be replaced with a UL node.

An unlicensed band is defined across various bands in various countries. In addition, in the unlicensed band, there is a regulation for limiting maximum transmit power and maximum power spectral density (PSD) since nodes using various wireless protocols can coexist. The PSD may be a barometer indicating a way of distributing the transmit power across a bandwidth.

Table 1 shows an example of a requirement for maximum transmit power and maximum PSD in Europe.

TABLE 1

| Frequency range (MHz) | Maximum transmit power (dBm) | Maximum PSD (dBm/MHz) | Comment |
| --- | --- | --- | --- |
| 5150-5350 | 23 | 10 | 20 MHz and 40 MHz channels |
| 5470-5725 | 30 | 17 | 20 MHz and 40 MHz channels |
| 5725-5875 | 33 | 23 | 10 MHz channel |
| 5725-5875 | 36 | 23 | 20 MHz channel |

Table 2 shows an example of a requirement for maximum transmit power and maximum PSD in the United States of America.

TABLE 2

| Frequency range (MHz) | Maximum transmit power (dBm) | Maximum PSD (dBm/MHz) | Comment |
| --- | --- | --- | --- |
| 5150-5250 | 30 | 4 | |
| 5250-5350 | 24 | 11 | |
| 5470-5725 | 24 | 11 | |
| 5725-5825 | 30 | 17 | |

Even if a wireless cellular system such as an LTE system operates in an unlicensed band, it must operate not to violate a transmit power/PSD regulation for each country and for each band as described above. However, in the conventional LTE system, transmit power of a UE is limited only by maximum transmit power per cell configured for the UE.

Hereinafter, a transmit power control scheme suitable for a power regulation of an unlicensed band is proposed when the LTE system operates in the unlicensed band. Although it is assumed that the power control scheme is performed by the UE, it may also be performed by a BS.

Hereinafter, it is exemplified that a primary cell operates in a licensed band, and a secondary cell operates in an unlicensed band. The proposed transmit power method may also be applied to an independent cell in the unlicensed band.

Figure 2:
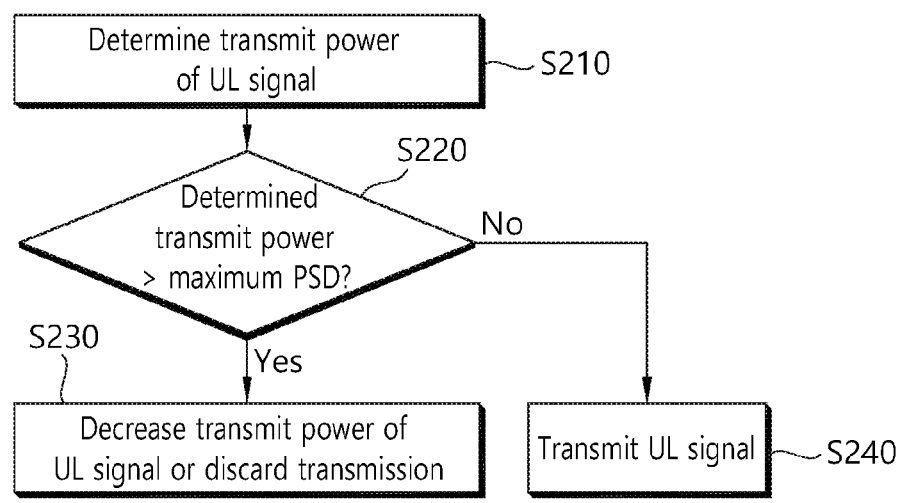
FIG. 2 shows a method of controlling transmit power according to an embodiment of the present invention.

FIG. 2 shows a method of controlling transmit power according to an embodiment of the present invention.

In step S210, a UE determines transmit power for an uplink (UL) signal of a secondary cell. The UL signal may include at least any one of a physical uplink control channel (PUCCH), a physical uplink shared channel (PUSCH), a sounding reference signal (SRS), and a random access preamble.

In step S220, the UE determines whether the determined transmit power exceeds maximum PSD.

In step S230, if the determined transmit power exceeds the maximum PSD, the UE may adjust the transmit power of the UL signal not to exceed the maximum PSD or may discard transmission of a corresponding signal. In step S240, if the determined transmit power does not exceed the maximum PSD, the UE transmits the UL signal.

If it is assumed that the transmit power is roughly identical across a frequency band, the transmit PSD may be calculated as Ptx/BWtx. Ptx denotes transmit power of a UL signal, and BWtx denotes a transmission bandwidth of the UL signal or a bandwidth actually occupied by the UL signal.

The maximum PSD may be defined in the following manner.

For example, the maximum PSD may be maximum PSD predetermined for each country and for each band as shown in Table 1 or Table 2.

For another example, information regarding the maximum PSD for each cell may be provided to the UE via a primary cell. The information may be transmitted by using a radio resource control (RRC) message or system information.

For another example, the UE may determine maximum PSD of a corresponding cell on the basis of maximum transmit power per cell. The UE may use a value obtained by dividing the maximum transmit power by a bandwidth of a corresponding cell or a unit bandwidth as the maximum PSD.

The maximum PSD may be defined as maximum transmit power allowed per unit bandwidth. The unit bandwidth may be defined as the number of one or more resource blocks (RBs), N MHz (N>=1 where N is a natural number), or a combination thereof. For example, the unit bandwidth may be defined as the maximum number of RBs that can be included within 1 MHz. Information regarding the unit bandwidth may be provided to the UE via the primary cell.

Figure 3:
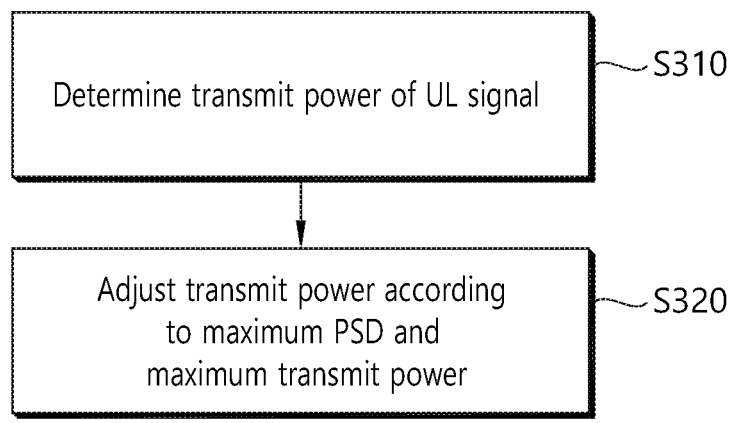
FIG. 3 shows a method of controlling transmit power according to another embodiment of the present invention.

FIG. 3 shows a method of controlling transmit power according to another embodiment of the present invention.

In step S310, a UE determines transmit power for a UL signal of a secondary cell.

In step S320, the UE adjusts the transmit power determined according to maximum PSD and maximum transmit power. The maximum PSD and maximum transmit power may be given per cell. The maximum PSD may be defined according to the aforementioned embodiment.

In an unlicensed band, in addition to a PSD limit, the maximum transmit power may be limited according to inter-cell interference control and power capability of the UE. Therefore, in the unlicensed band, the maximum transmit power and the PSD may be both limited for the UE.

In a corresponding cell, if the transmit power of the UL signal exceeds the maximum transmit power or the maximum PSD, the UE may adjust the transmit power of the UL signal or may discard transmission.

The maximum transmit power may be maximum transmit power Pmax,c per cell and maximum transmit power Pmax for all cells. The transmit power of the UE may be controlled as follows.

In a first embodiment, for each cell, the transmit power of the UL signal is first determined not to exceed Pmax,c. Then, the determined transmit power is adjusted not to exceed the maximum PSD. The transmit power of the UL signal of each cell is adjusted such that the transmit power for all cells does not exceed the Pmax.

If a sum of a plurality of transmit powers of a plurality of UL signals for a plurality of cells in an unlicensed band exceeds the Pmax, the plurality of transmission powers may be reduced or transmission of some UL signals may be discarded. The transmission may be discarded by assigning a priority according to a type of the UL signal. For example, transmission of a UL signal having a low priority may be discarded in the order of a PUCCH (a highest priority), a PUSCH, and an SRS (a lowest priority).

In a second embodiment, for each cell, the transmit power of the UL signal is first determined not to exceed the Pmax,c. Then, the transmit power is adjusted such that the transmit power for all cells does not exceed the maximum PSD and the Pmax. If a sum of a plurality of transmit powers of a plurality of UL signals for a plurality of cells in an unlicensed band exceeds the Pmax or the maximum PSD, the plurality of transmission powers may be reduced or transmission of some UL signals may be discarded. The transmission may be discarded by assigning a priority according to a type of the UL signal.

For example, assume that two secondary cells, i.e., a first cell and a second cell, are configured in the unlicensed band, and PUSCH transmission is triggered in the first cell and SRS transmission is triggered in the second cell. First, transmit power of the PUSCH is determined not to exceed maximum transmit power of the first cell. Transmit power of the SRS is determined not to exceed maximum transmit power of the second cell. In addition, it is determined whether a sum of PSDs of the PUSCH/SRS determined according to a transmission band of the PUSCH/SRS exceeds maximum PSD. If it exceeds the maximum PSD, which signal will be transmitted may be determined according to a priority. If the SRS has a lower priority, the PUSCH may be transmitted in the first cell, and SRS transmission of the second cell may be discarded. By using a primary cell of a licensed band, the UE may report information regarding whether UL transmission exceeds the maximum PSD and/or whether transmission of the UL signal is discarded.

In addition, the UE may transmit PSD information through RRC signaling or MAC signaling to inform a network of a margin of transmit power relative to its PSD limit. The PSD information may include information on a transmit PSD value obtained by applying a statistical average for a UL signal transmitted at any time point or UL signals transmitted at several time points or information on a difference between the transmit PSD value and a predefined maximum PSD value. The transmit PSD value may be expressed as transmit power per unit bandwidth.

Meanwhile, an LTE system generally allows the UE to operate with only smaller transmit power in a specific situation in comparison with available transmit power. For example, even if the UE has a power class capable of supporting transmit power of up to 23 dBm, the UE is allowed to operate only within smaller maximum transmit power such as 21 dBm to satisfy a spectral emission mask requirement in case of a high modulation order such as 64-QAM. This is called maximum power reduction (MPR).

That is, in LTE, the maximum transmit power configured for the UE is obtained by applying the MPR to available maximum transmit power of the UE. The MPR may be a maximum lower limit value of maximum output power defined to allow the UE to autonomously perform power reduction.

According to the section 6.2 of 3GPP TS 36.101 V10.3.0 (2011-06), the MPR is defined as follows.

TABLE 3

| Modulation scheme | Channel bandwidth (MHz) | | | | | | MPR (dB) |
|---|---|---|---|---|---|---|---|
| | 1.4 | 3 | 5 | 10 | 15 | 20 | |
| QPSK | >5 | >4 | >8 | >12 | >16 | >18 | <=1 |
| 16-QAM | <=5 | <=4 | <=8 | <=12 | <=16 | <=18 | <=1 |
| 16-QAM | >5 | >4 | >8 | >12 | >16 | >18 | <=2 |

If it is required to limit the maximum PSD in the unlicensed band, a level of maximum transmit power that can be transmitted by the UE while satisfying a PSD requirement according to how much uniform transmit power can be maintained in a frequency region depending on a characteristic of a radio frequency (RF) module implemented by the UE. Therefore, the MPR may be applied in a frequency band to which the maximum PSD is applied to mitigate a requirement for the maximum transmit power that can be transmitted by the UE.

A greater MPR value may be applied to an unlicensed band in comparison with a licensed band. For example, additional MPR may be defined in the unlicensed band on the basis of an MPR value in the licensed band.

Now, a method of transmitting a data channel in a broadband is described.

If a maximum PSD limit is applied in an unlicensed band, a distance between a BS and a UE becomes far, and thus great transmit power may be required to transmit a small payload. In this case, the BS or the UE must transmit the data channel through a wide frequency band to satisfy the PSD limit. A size of the payload that can be transmitted through a PDSCH or a PUSCH in an LTE system is determined by a transport block size (TBS). The following table shows an example of the TBS used in the LTE system.

When the maximum PSD limit is applied in the unlicensed band, it is proposed that a minimum TBS against the same number of RBs is defined to be smaller than a case of not applying the PSD limit. For example, in Table 3, the TBS is 1128 when the number of RBs is 41. If the maximum PSD limit is applied in the unlicensed band, the TBS is less than 1128 when the number of RBs is 41.

Since the minimum TBS is limited according to the number of RBs and the number of bits of a TBS index in the LTE system, the following method may be used.

1) A smaller minimum TBS is supported by widening a spacing of TBSs identified by a TBS index with respect to the number of RBs.

2) A TBS corresponding to a specific TBS index is replaced to indicate a TBS smaller than the existing minimum TBS with respect to the number of RBs.

3) The number of bits of the TBS index is increased to indicate more TBSs than the existing TBSs with respect to the number of RBs. The number of RB allocation bits in control information for scheduling a PDSCH/PUSCH can be reduced and more bits can be utilized for the TBS index in such a manner that only the predetermined number of RBs is used for granularity of the number of RBs supportable in an unlicensed band or the number of RBs is reported in advance.

Since multiplexing may be difficult in a frequency region for a plurality of UEs due to a PSD limit in the unlicensed band, a bandwidth at which a PDSCH/PUSCH is transmitted may be fixed to a specific bandwidth, or a BS may provide information on the specific bandwidth to the UE.

Figure 4:
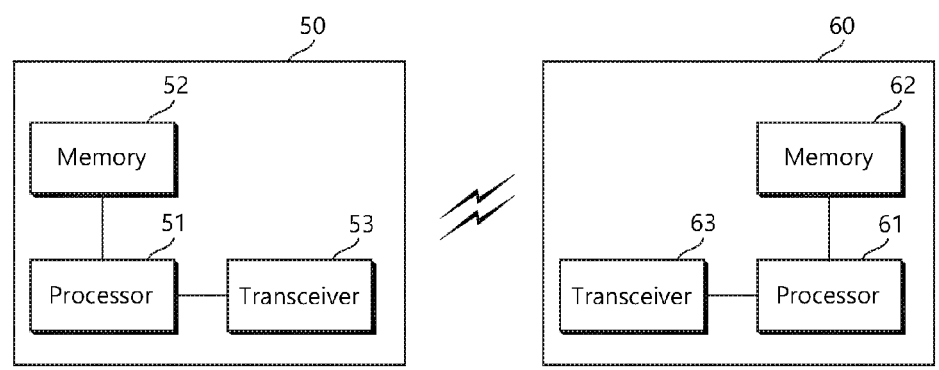
FIG. 4 is a block diagram showing a wireless communication system according to an embodiment of the present invention.

FIG. 4 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the UE may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and

TABLE 4

| | The number of RBs | | | | | | | | | |
|---|---|---|---|---|---|---|---|---|---|---|
| $I_{TBS}$ | 41 | 42 | 43 | 44 | 45 | 46 | 47 | 48 | 49 | 50 |
| 0 | 1128 | 1160 | 1192 | 1224 | 1256 | 1256 | 1288 | 1320 | 1352 | 1384 |
| 1 | 1480 | 1544 | 1544 | 1608 | 1608 | 1672 | 1736 | 1736 | 1800 | 1800 |
| 2 | 1800 | 1864 | 1928 | 1992 | 2024 | 2088 | 2088 | 2152 | 2216 | 2216 |
| 3 | 2408 | 2472 | 2536 | 2536 | 2600 | 2664 | 2728 | 2792 | 2856 | 2856 |
| 4 | 2984 | 2984 | 3112 | 3112 | 3240 | 3240 | 3368 | 3496 | 3496 | 3624 |

$I_{TBS}$ is an index of the TBS, and the TBS is determined according to the number of RBs used in transmission of the PDSCH/PUSCH. Therefore, it can be said that a minimum TBS that can be transmitted through the PDSCH/PUSCH is limited by the number of RBs.

stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for controlling a transmit power in a wireless communication system, the method comprising:
   determining, by a wireless device, a first transmit power of a first uplink (UL) signal for a first cell and a second transmit power of a second UL signal for a second cell, wherein the first cell and the second cell are configured in an unlicensed band;
   determining, by the wireless device, that a sum of power spectral densities (PSDs) of the first UL signal and the second UL signal exceeds a maximum PSD of the unlicensed band;
   determining, by the wireless device, that the second UL signal has a lower priority than the first UL signal in response to the sum of the PSDs exceeding the maximum PSD; and
   transmitting, by the wireless device, the first UL signal in response to the second UL signal having the lower priority than the first UL signal, wherein the second UL signal is discarded.

2. The method of claim 1, further comprising:
   receiving, by the wireless device, information regarding the maximum PSD from a serving cell of a licensed band.

3. The method of claim 2, wherein the serving cell of the licensed band is a primary cell, and the first cell and the second cell in the unlicensed band are secondary cells.

4. The method of claim 1, further comprising:
   reporting, by the wireless device, information regarding the PSD of the first UL signal.

5. The method of claim 1, wherein the first UL signal includes a physical uplink shared channel (PUSCH) signal and the second UL signal includes a sounding reference signal (SRS).

6. An apparatus for controlling a transmit power in a wireless communication system, the apparatus comprising:
   a transceiver configured to transmit and receive a radio signal; and
   a processor operatively coupled to the transceiver and configured to:
   determine a first transmit power of a first uplink (UL) signal for a first cell and a second transmit power of a second UL signal for a second cell, wherein the first cell and the second cell are configured in an unlicensed band;
   determine that a sum of power spectral densities (PSDs) of the first UL signal and the second UL signal exceeds a maximum PSD of the unlicensed band;
   determine that the second UL signal has a lower priority than the first UL signal in response to the sum of the PSDs exceeding the maximum PSD; and
   transmit the first UL signal in response to the second UL signal having the lower priority than the first UL signal, wherein the second UL signal is discarded.

7. The apparatus of claim 6, wherein the processor is configured to receive information regarding the maximum PSD from a serving cell of a licensed band.

8. The apparatus of claim 7, wherein the serving cell of the licensed band is a primary cell, and the first cell and the second cell in the unlicensed band are secondary cells.

9. The apparatus of claim 6, wherein the first UL signal includes a physical uplink shared channel (PUSCH) signal and the second UL signal includes a sounding reference signal (SRS).

* * * * *